United States Patent
Roosa et al.

(10) Patent No.: US 8,511,953 B2
(45) Date of Patent: Aug. 20, 2013

(54) NUT PLATE INTEGRAL EPOXY FILLED SLEEVE

(75) Inventors: Patrick Roosa, Liberty, IN (US);
Norman Austin, West Chester, OH (US);
Edward Claude Rice, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 649 days.

(21) Appl. No.: 12/645,253

(22) Filed: Dec. 22, 2009

(65) Prior Publication Data

US 2010/0166523 A1 Jul. 1, 2010

Related U.S. Application Data

(60) Provisional application No. 61/204,037, filed on Dec. 31, 2008.

(51) Int. Cl.
*F16B 39/02* (2006.01)

(52) U.S. Cl.
USPC .............. 411/82; 411/81; 411/82.3; 411/108; 411/191

(58) Field of Classification Search
USPC ........... 411/70, 82, 82.1–82.3, 103, 108–109, 411/167, 171, 181, 191, 432, 81; 405/259.6
See application file for complete search history.

(56) References Cited

U.S. PATENT DOCUMENTS

| | | | |
|---|---|---|---|
| 2,344,102 A | | 3/1944 | Meisterhans |
| 2,451,991 A * | | 10/1948 | Swanstrom .................. 411/103 |
| 3,742,808 A * | | 7/1973 | Trembley ...................... 411/432 |
| 4,009,778 A * | | 3/1977 | Howell .......................... 206/219 |
| 4,105,114 A * | | 8/1978 | Knox et al. ................. 405/259.6 |
| 4,193,435 A * | | 3/1980 | Frosch et al. .................. 411/113 |
| 4,227,612 A * | | 10/1980 | Dillon ........................... 206/219 |
| 4,607,984 A | | 8/1986 | Cassidy |
| 4,729,696 A * | | 3/1988 | Goto et al. ................. 405/259.6 |
| 4,732,518 A * | | 3/1988 | Toosky ......................... 411/181 |
| 4,895,484 A * | | 1/1990 | Wilcox ........................... 411/85 |
| 5,013,391 A | | 5/1991 | Hutter, III et al. |
| 5,096,350 A * | | 3/1992 | Peterson ......................... 411/12 |
| 5,098,228 A * | | 3/1992 | Mauthe ...................... 405/259.6 |
| 5,146,668 A * | | 9/1992 | Gulistan ......................... 29/525 |
| 5,205,690 A | | 4/1993 | Roth |
| 5,704,747 A | | 1/1998 | Hutter, III et al. |
| 5,785,462 A | | 7/1998 | Hein et al. |

(Continued)

FOREIGN PATENT DOCUMENTS

DE     19519397 A1    11/1996

OTHER PUBLICATIONS

International Search Report and Written Opinion, PCT/US2009/069445, Feb. 4, 2010, Rolls-Royce Corporation.

(Continued)

*Primary Examiner* — Roberta Delisle
(74) *Attorney, Agent, or Firm* — Krieg DeVault LLP

(57) ABSTRACT

A system includes a nut plate and a polymer sleeve passing through the nut plate. The polymer sleeve contains adhesive for attachment of the nut plate to a substrate. The interior of the sleeve includes an epoxy and a catalyzing agent initially separated from one another, but mixed by kneading the sleeve. A portion of the sleeve can be used to apply the adhesive to a bottom surface of the nut plate.

16 Claims, 11 Drawing Sheets

(56) References Cited

U.S. PATENT DOCUMENTS

| | | |
|---|---|---|
| 6,017,176 A | 1/2000 | Marui |
| 6,773,780 B2 | 8/2004 | Hutter, III et al. |
| 6,899,503 B2 * | 5/2005 | Anderson et al. ............. 411/533 |
| 6,979,158 B2 * | 12/2005 | Clinch et al. .................. 411/112 |
| 7,021,875 B2 * | 4/2006 | Yake et al. .................... 411/111 |
| 2005/0025606 A1 | 2/2005 | Toosky |
| 2005/0117994 A1 | 6/2005 | Toosky |
| 2005/0220562 A1 | 10/2005 | Blackaby |
| 2006/0153645 A1 | 7/2006 | Rataj et al. |

OTHER PUBLICATIONS

Extended European Search Report, European Patent Office, EP 09837047, May 27, 2013, Rolls-Royce Corporation.

\* cited by examiner

NUT PLATE INTEGRAL EPOXY FILLED SLEEVE

CROSS REFERENCE TO RELATED APPLICATIONS

The present application claims the benefit of U.S. Provisional Patent Application 61/204,037, filed Dec. 31, 2008, and is incorporated herein by reference.

FIELD OF THE INVENTION

The present invention relates to nut plates and methods of attaching a nut plate to a substrate. More specifically, the present invention relates to a nut plate adhesively bonded to a surface.

BACKGROUND

Nut plates are typically used where access to restrain half of a threaded fastener system, typically a nut, is difficult or impossible due to assembly complexities. Nut plates are typically riveted in place which require holes being drilled into a mating surface of the nut plate and installation of rivets to hold the nut plate to the surface. Rivet holes can cause other problems by themselves as they are a machined feature requiring additional analysis and inspection. The rivet holes must be analyzed for effects on stress levels within the part where the holes are being drilled.

SUMMARY

In one embodiment of the present invention an apparatus includes a nut having an internally threaded opening; and a basket attached to the threaded nut. The basket has an access opening that at least partially overlaps the central opening of the nut. The apparatus also includes a sleeve extending through the opening of the nut and the access opening of the basket. The sleeve has an at least partially hollow interior including an adhesive.

In one refinement the adhesive includes an epoxy, and the interior of the sleeve further includes a hardener separated from the epoxy.

In another refinement the interior of the sleeve defines a first chamber containing the epoxy and a second chamber containing the hardener.

In another refinement at least a portion of an intervening wall between the first chamber and the second chamber is frangible.

In another refinement the sleeve is polymer.

In another refinement the sleeve includes a neckdown area at a portion spaced apart from a bottom surface of the basket.

In another refinement a portion of the interior of the sleeve includes a mixing chamber, and the sleeve is flexible around that portion of the interior.

In another refinement the mixing chamber contains a frangible capsule, and at least one of the epoxy and the hardener are within the capsule, and the other of the epoxy and the hardener are external to the capsule.

In another refinement a bottom surface of the basket adjacent to the access opening includes a swage.

In another embodiment of the present invention an apparatus includes a nut, and a plate attached to the nut. A sleeve passes through an aligned pair of openings in the nut and the plate. The sleeve has an at least partially hollow interior that contains an adhesive.

In one refinement the adhesive includes an epoxy, and the interior further includes a catalyzing agent separated from the epoxy.

In another refinement the interior of the sleeve defines a first chamber containing the epoxy and a second chamber containing the catalyzing agent.

In another refinement the sleeve is polymer.

In another refinement a portion of the interior of the sleeve includes a mixing chamber and the sleeve is flexible around that portion of the interior.

In another refinement the mixing chamber contains a frangible capsule, and at least one of the epoxy and the catalyzing agent are within the capsule and the other of the epoxy and the catalyzing agent are external to the capsule.

In another embodiment of the present invention there is a method of attaching a nut plate to a substrate which includes providing a threaded nut with a basket at a lower end of the nut, and a sleeve extending through the threaded nut and basket. The sleeve has a separated two part adhesive within an at least partially hollow interior of the sleeve; squeezing the sleeve to mix the two part adhesive; removing a portion of the sleeve containing a mixture of the two part adhesive; using the portion to dispense the mixture of the two part adhesive to the basket; and contacting the basket to the substrate.

In one refinement the method aligns the threaded nut over an opening in the substrate using a top portion of the sleeve.

In another refinement the method includes removing the top portion of the sleeve after the epoxy has hardened by pulling on an end of the sleeve that extends beyond the threaded nut.

In another refinement the providing of the sleeve includes providing a polymer sleeve that includes a capsule containing one of the epoxy and the hardener positioned within a chamber that includes the other of the epoxy and the hardener.

In another refinement the bottom portion of the sleeve is removed by cutting the sleeve at a position below the back surface of the basket.

In another refinement the back surface of the basket is pressed against the substrate by pushing against a top portion of the sleeve.

In another refinement the back surface of the basket is pressed against the substrate by pulling on a portion of the sleeve remaining beneath the back surface of the basket after the bottom portion is removed.

Another embodiment of the present invention contemplates an system comprising: a nut plate assembly and a polymer sleeve positioned through the nut plate assembly, the polymer sleeve having an upper portion and a lower portion, the lower portion being separable from the upper portion and containing an adhesive.

Another embodiment comprises a nut plate arrangement containing a threaded nut, a basket to hold the nut, and a polymer sleeve containing an epoxy mixture.

Further embodiments, forms, objects, features, advantages, aspects, methods, and benefits of the present invention shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
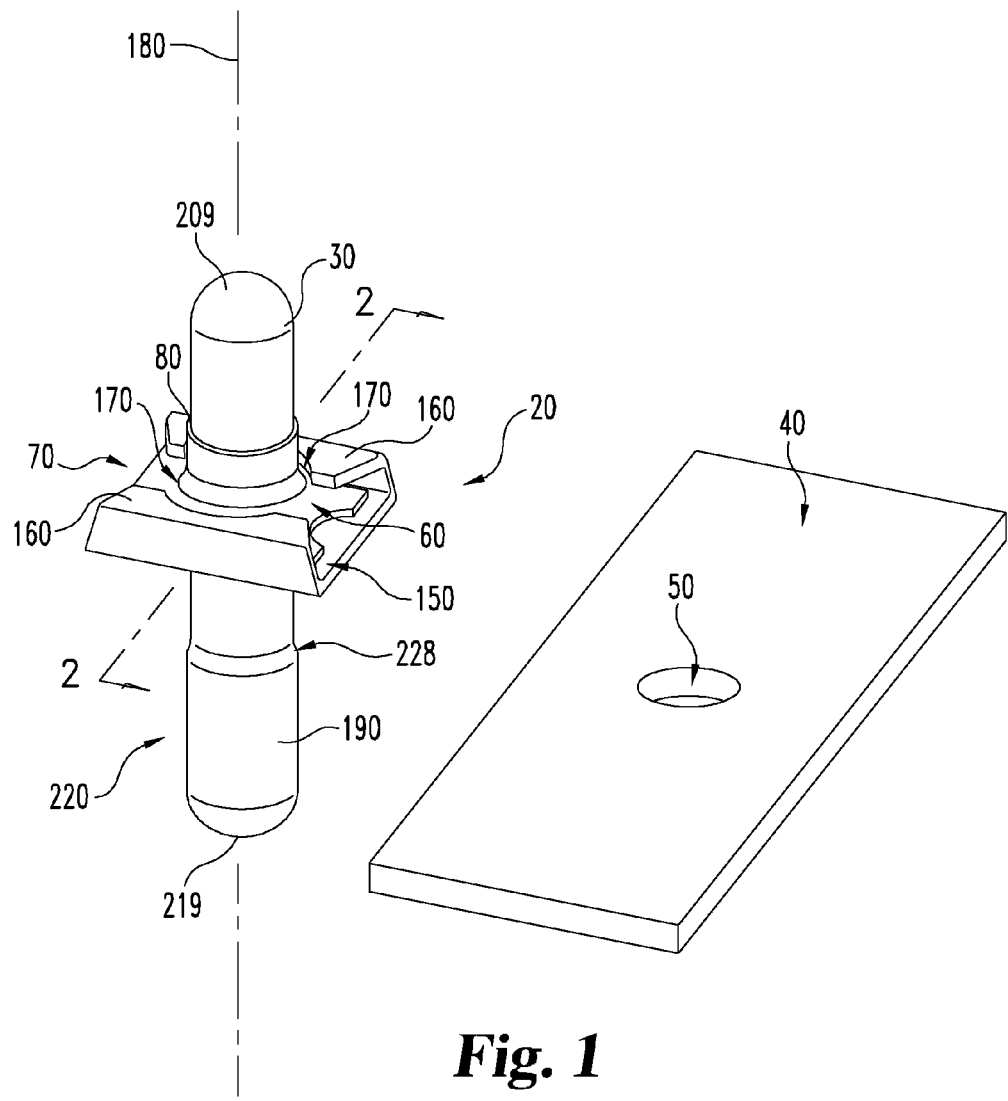
FIG. 1 is a perspective view of one embodiment of a nut plate assembly and an adhesive containing sleeve.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a nut plate assembly 20 and an adhesive containing sleeve 30 passed through an opening in the nut plate assembly 20. The nut plate assembly 20 is adapted for mounting to a substrate 40 that includes at least one opening 50. The sleeve 30 may pass through the opening in the nut plate assembly 20 and the substrate aligning the two openings. A person of ordinary skill in the art will appreciate that the nut plate assembly 20 and substrate 40 may be formed of any number of materials including metal, composites, plastics, and combinations thereof. Additionally, the nut plate assembly 20 and the substrate 40 may be formed from different materials. In one form of the present application, the nut plate assembly 20 and the substrate 40 are both formed from metal.

Figure 2:
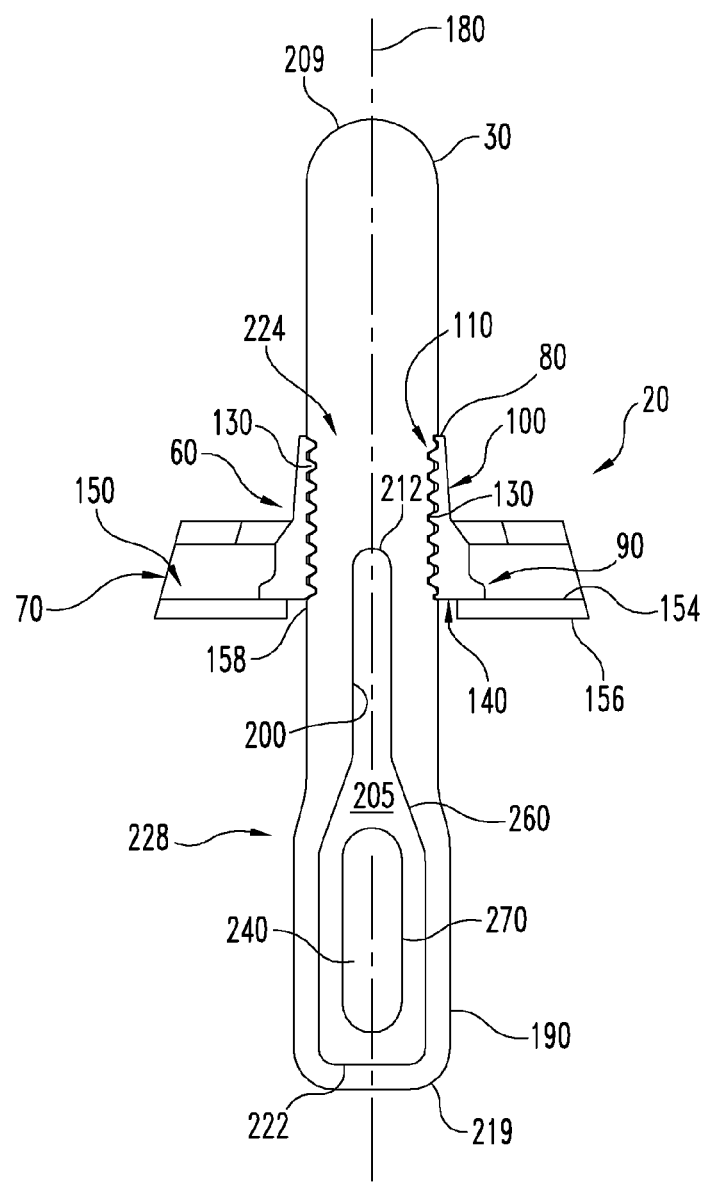
FIG. 2 is an illustrative side view cut-away along line 2-2 of FIG. 1.

As shown in FIGS. 1 and 2, the nut plate assembly 20 includes an internally threaded nut 60 and an attached bracket or basket 70. The substantially annular nut 60 extends between an upper end 80 and a lower end 90. The upper portion of the nut 60 includes an outer surface 100 and an inner surface 110. The inner surface 110 has a plurality of threads 130 operable to receive a fastener (not shown). The lower end 90 is attached to a plate portion 150 of the basket 70. The plate portion 150 includes a top surface 154 at least a portion of which is attached to the lower end 90 of the nut 60. The plate portion 150 also includes a bottom or substrate engaging surface 156 operable for contact with the substrate 40. The plate portion 150 defines an opening 158 that at least partially overlaps and is aligned with the opening defined by the inner surface 110 of the nut 60. In one form, the basket 70 may further include a pair of wing members 160 that each includes a relief portion 170 having a shape substantially similar to the outer surface 100 of the nut 60. In one form of the present application, the nut 60 and the basket 70 are coupled together by welding the lower end 90 of the nut 60 to the plate portion 150 of the basket 70. In other forms, the nut 60 and the basket 70 may include clips, tabs or slots for engagement and/or may be coupled together in other conventional attachment methods known to those skilled in the art. In still other forms, the nut 60 and the basket 70 may be integrally formed as a single piece.

Again referring to FIGS. 1 and 2, the adhesive containing sleeve 30 is preferably substantially symmetrical about an axis 180. The sleeve 30 is preferably a polymer or polymer based material and passes through the opening(s) of nut plate assembly 20. Sleeve 30 extends below the opening 158 in the plate portion 150. The sleeve 30 includes an outer wall 190 extending between a top end 209 and a bottom end 219. Referring now to FIG. 2, sleeve 30 further includes an internal wall 200 defining a cavity 205 creating an at least partially hollow chamber or interior of the sleeve 30. In one form the cavity 205 extends between an upper end 212 and a lower end 222 and contains an adhesive. In one form, the adhesive is a two-part adhesive including an epoxy part and a catalyzing agent (hardener) part. The sleeve 30 passes through the nut plate assembly 20 and is preferably centered along the axis 180. In one form, the sleeve 30 includes a thread engaging portion 224 and a stepped portion 228 having a diameter larger than the diameter of the remainder of the sleeve 30. In other forms, the sleeve 30 maintains a substantially uniform diameter. As described in further detail below, the thread engaging portion 224 contacts the inner surface 110 of nut 60 to protect the threads 130 from adhesive contamination during installation of the nut plate assembly 20 onto the substrate 40.

Continuing with FIG. 2, the cavity 205 of sleeve 30 contains at least one of the epoxy or hardener. The sleeve 30 may further include a second chamber containing the other of the epoxy or hardener. Alternatively, instead of being a second chamber defined by the sleeve 30, the second chamber may be a capsule 240 positioned within the cavity 205. The capsule 240 would contain the other of the epoxy or hardener. In the form of the present application shown in FIG. 2, the cavity 205 is divided into two separated parts by a thin wall 270 creating a frangible capsule 240.

By squeezing a flexible portion of the end of the polymer sleeve 30 with the adhesive, the thin wall 270 of the capsule 240 is broken allowing the epoxy and hardener to mix in the chamber 205. In one form, the sleeve 30 contains an interior portion including a mixing chamber 205 which further includes a frangible capsule 240. At least one of the epoxy and the hardener is located inside the capsule 240 and the other is inside the mixing chamber 205 but external to the capsule 240. The portion of the sleeve 30 surrounding the mixing chamber 205 is flexible allowing the adhesive to be mixed inside the mixing chamber 205.

Mixing may be accomplished by squeezing or kneading, for example, the end of the polymer sleeve 30 with the adhesive. The chamber 205 is preferably sized to contain the appropriate amount of adhesive for installation of the nutplate assembly 20 to the substrate 40. The operator or user (not shown) preferably squeezes the sleeve 30 near the stepped portion 228 either via the user's hand or a tool such as pliers (not shown). In one form, the sleeve 30 would be flexible in the stepped portion 228 surrounding the chamber 205. Thus, using the chamber 205 as a mixing chamber within the sleeve 30, the user can mix an adhesive in the form of an epoxy and a hardener without the use of any special tools or a separate mixing container. It can be appreciated that the squeezing can occur on a variety of portions of the polymer sleeve 30. For example, as discussed elsewhere herein, the chamber containing epoxy might be at one end of the sleeve 30 and the hardener on the other end of the sleeve. Moreover, in some embodiments the user might preferably knead multiple portions of the sleeve 30 to aid in mixing of the adhesive.

One method of attaching the nut plate assembly 20 to the substrate 40 will now be described. In one form of the present invention the adhesive can be applied by puncturing the sleeve near the basket of the nut plate assembly. Alternatively, the bottom portion of the sleeve can be removed (by cutting or tearing), and this separate bottom portion may be used as an applicator/dispenser. After use, this applicator/dispenser portion is disposed of. In one form, a neckdown area within the sleeve might also be incorporated such that by twisting the sleeve, a thin wall would rupture allowing the adhesive to be squeezed out onto the back surface of the basket. The upper portion of the sleeve that is positioned within and contacts the nut remains in place to protect the threads from contamination by the adhesive. Moreover, a portion of the sleeve can also be used as a piloting feature to center the nut plate to the hole in the substrate. The nut plate can either be pressed onto the surface or, if enough polymer length is left in place on the basket side of the nut plate, pulled into place from the opposite side of the substrate to which the nut plate is being bonded. Once the adhesive has cured, the remaining sleeve can be removed by simply pulling on the end of the sleeve that extends above the nut. Having briefly described one method of attaching one embodiment of the nut plate assembly to a substrate, various aspects of the same will now be further discussed with reference to the Figures.

Figure 3:
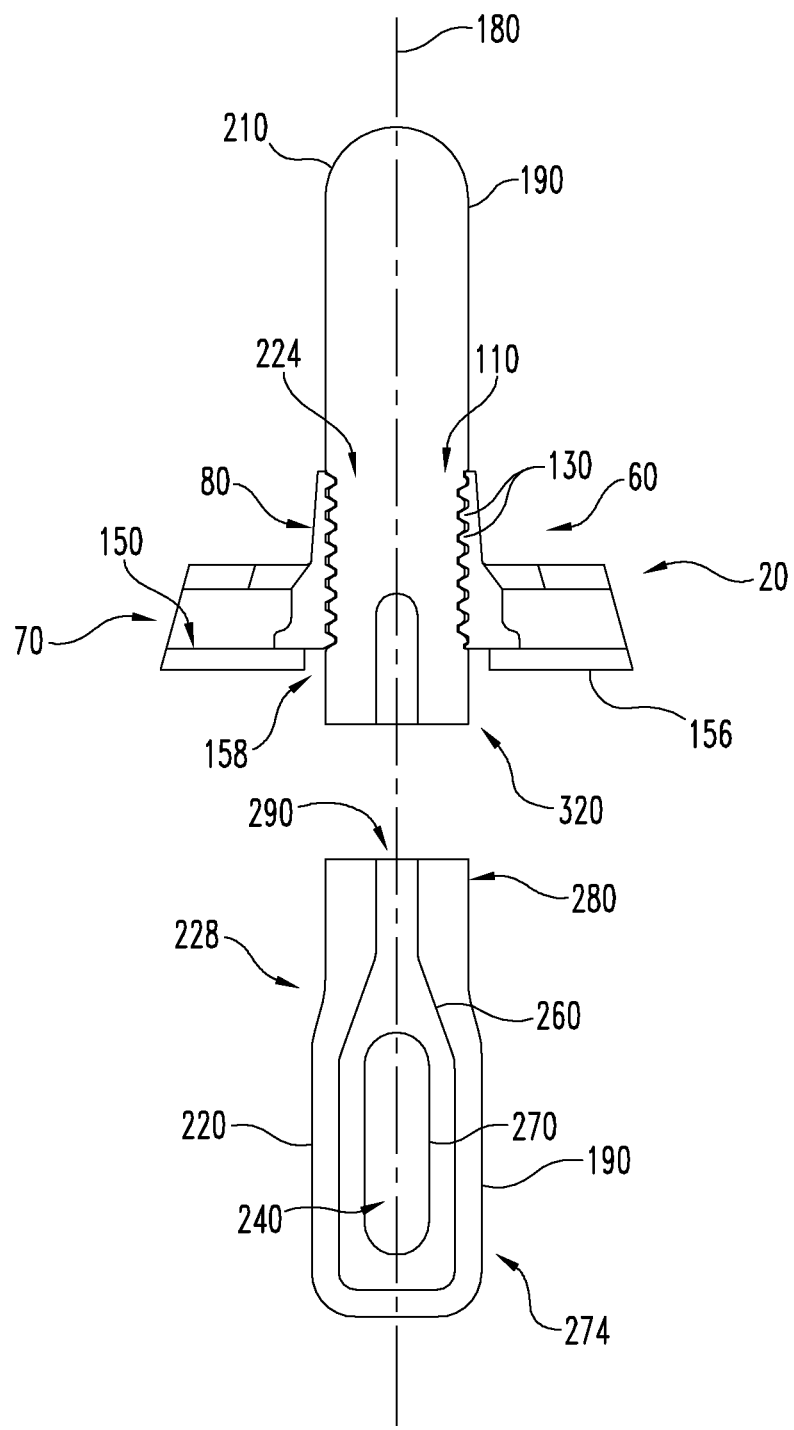
FIG. 3 is an illustrative side view showing the applicator portion from the embodiment of FIG. 2 removed.
Figure 4:
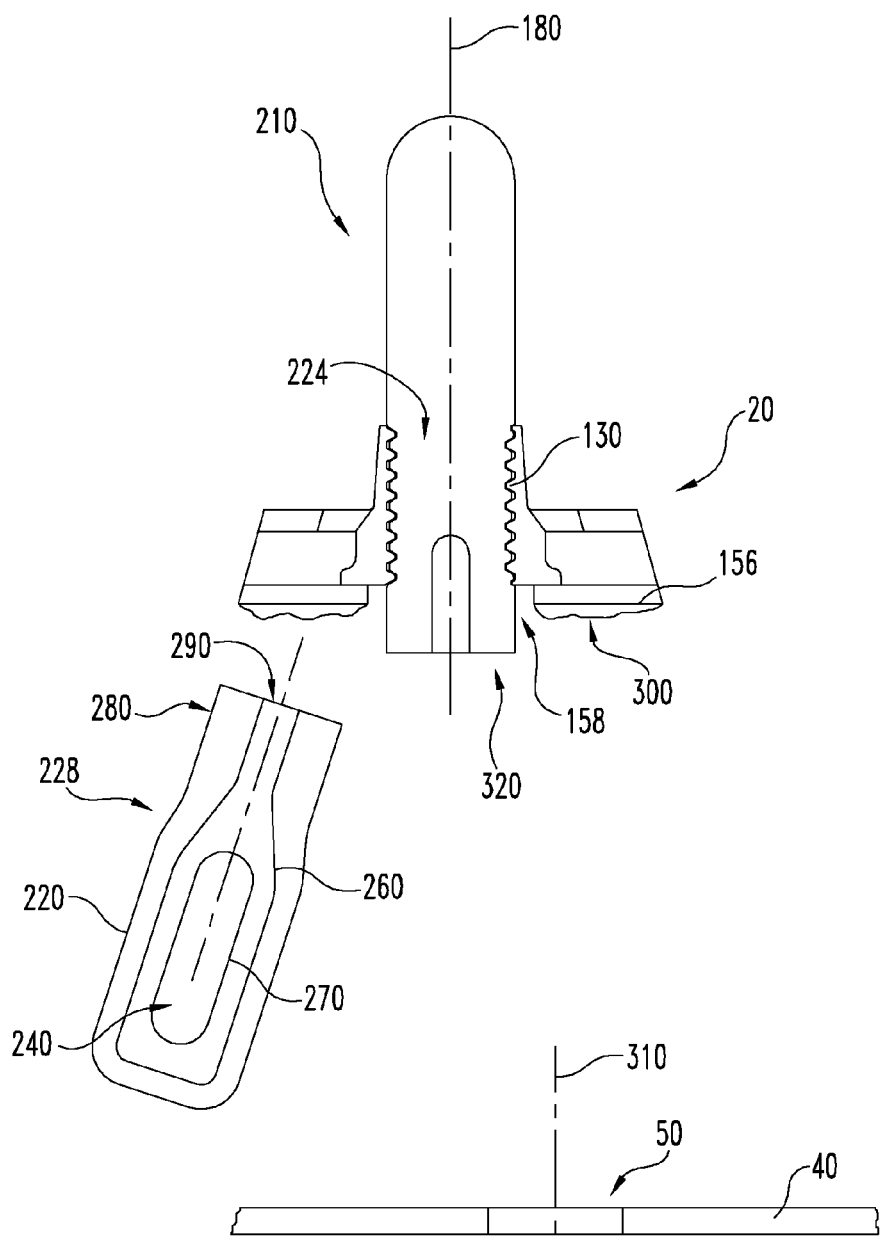
FIG. 4 is an illustrative side view showing application of an adhesive to the bottom surface of the nut plate assembly.

With reference to FIGS. 3 and 4, there is illustrated one aspect of applying adhesive according to one form of the present invention. After mixing the adhesive, the lower portion 220 of the sleeve 30 is separated from the upper portion 210 by, for example, cutting through the sleeve 30. In one form, the sleeve 30 may include a perforated or scored portion (not shown) aiding in the separation of the lower portion 220 from the upper portion 210. The line of separation might also be at a neckdown area 228. In one form, the lower portion 220 is separated from the upper portion 210 without the use of tools.

After separating the lower portion 220 of the sleeve 30 from the upper portion 210, the lower portion 220 can be used as an applicator to apply adhesive to the nut plate assembly 20. The lower portion 220 may include a grip portion 274, a neck portion 280, and an applicator opening 290. In one form, the grip portion 274 includes a larger diameter than the neck portion 280 and is sized to aid in the user's application of the adhesive mixture 300 (FIG. 4). In another form, the grip portion 274 and the neck portion 280 have the same size diameters. The applicator opening 290 is sized to allow a controlled flow of adhesive 300 onto the back surface 156 of the basket 70. In operation, the user compresses the grip portion 274 which forces the adhesive mixture 300 out of the cavity 205 through the applicator opening 290. The adhesive mixture 300 is applied to the substrate engaging surface 156, as shown in FIG. 4. In one form, the adhesive mixture 300 is preferably applied evenly and thoroughly to the substrate engaging surface 156. In another form, most, if not all, of the adhesive mixture 300 is applied to the substrate engaging surface 156. The adhesive mixture 300 is preferably pre-measured to ensure proper attachment of the nut plate assembly 20 to the substrate 40.

After the adhesive mixture 300 is applied to the substrate engaging surface 156 of the basket 70, the nut plate is aligned with a desired location on the substrate surface 40, in this case, the opening 50. The axis 180 of the nut plate assembly 20 and the remaining portion of the sleeve 30 is aligned with a center axis 310 of the opening 50 in the substrate 40 (see FIG. 4). In one form, the upper portion 210 of the sleeve 30 includes a piloting portion 320. The piloting portion 320 extends beneath the substrate engaging surface 156 of the basket 70 into the opening 50 in the substrate 40. This aids in alignment of the opening 158 of the basket 70 with the opening 50 in the substrate 40. The piloting portion 320 is sized to extend through the opening 158 and is preferably long enough to extend at least partially through the opening 50 in the substrate surface 40.

Figure 5:
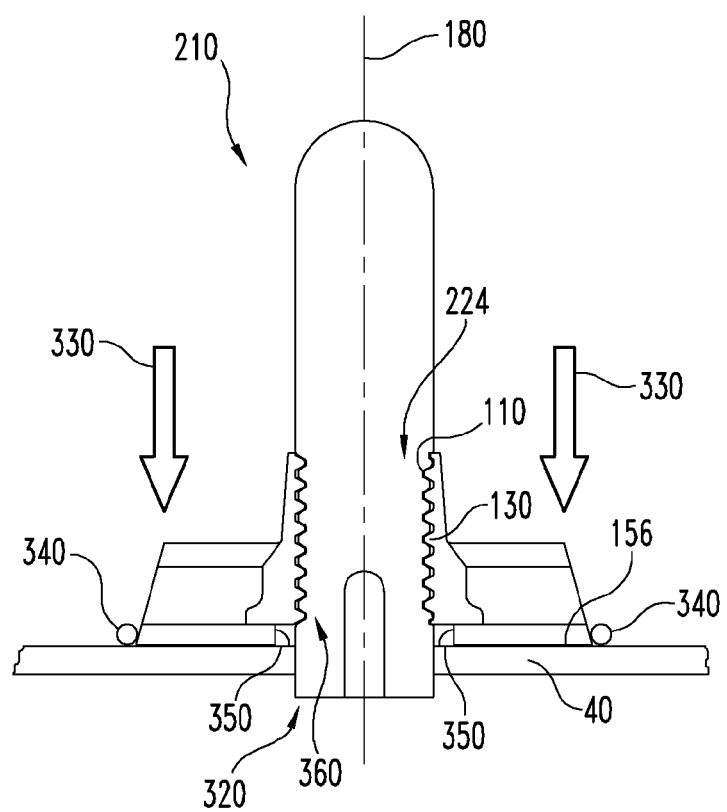
FIG. 5 is an illustrative side view showing the nut plate assembly binding to a surface.

After application of the adhesive mixture 300, the nut plate assembly 20 is pressed in a direction indicated by the arrows 330 towards the substrate surface 40, as illustrated in FIG. 5. The pressing action of the nut plate assembly 20 onto the surface of the substrate 40 forces any excess of the adhesive mixture 300 from under the surface 156. Any excess adhesive mixture 300 forms an outer bead 340 and/or an inner bead 350. The inner bead 350 is prevented from entering the threads 130 by the portion 224 of the sleeve 30 that contacts the threading 130 on the inner surface 110 of the nut 60. The present application further contemplates removal of excess glue or the removal of the sleeve before the glue adjoining the sleeve sets.

Figure 6:
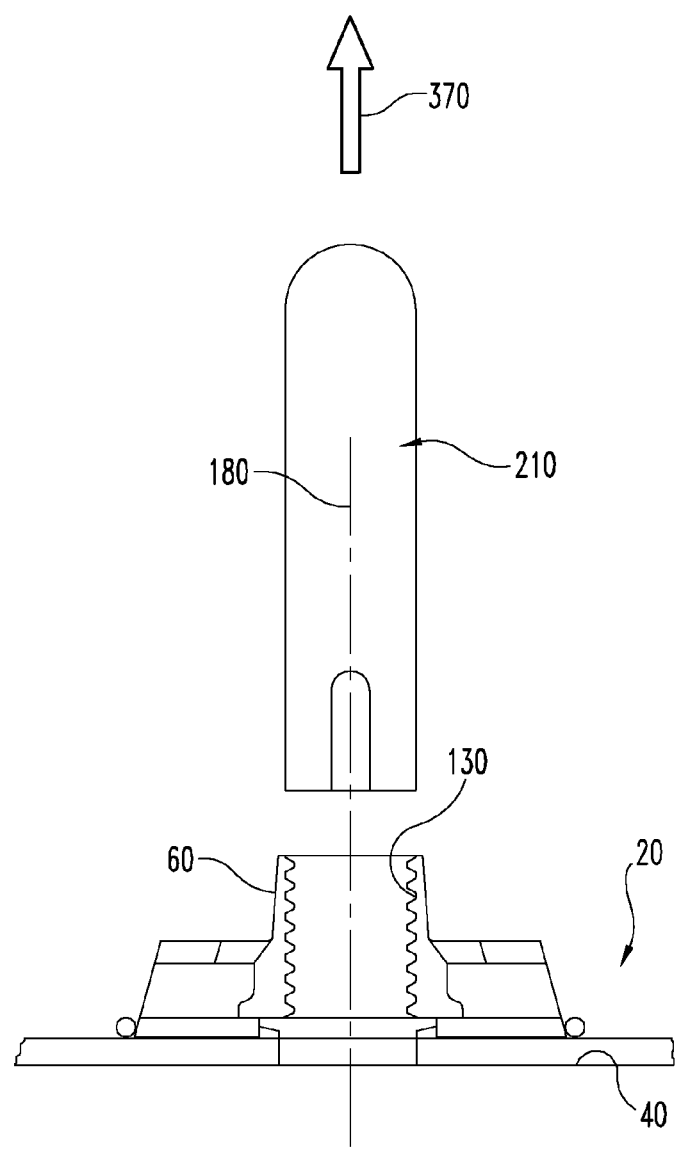
FIG. 6 is an illustrative side view showing the remainder of the sleeve being removed from the nut plate assembly.

After pressing the nut plate assembly 20 onto the surface 40, the upper portion 210 of the sleeve 30 is removed by pulling in an upward direction as illustrated by the arrow 370 in FIG. 6. It may be necessary to twist the upper portion 210 while pulling in the upward direction 370 to remove the upper portion 210 from the threaded portion of inner surface 110 of nut 60. In one form, the upper portion 210 is removed before the adhesive has hardened. In another form, the upper portion 210 is preferably removed after the adhesive has hardened. In yet another form, the sleeve 30 may be removed from below the basket 70.

Figure 7:
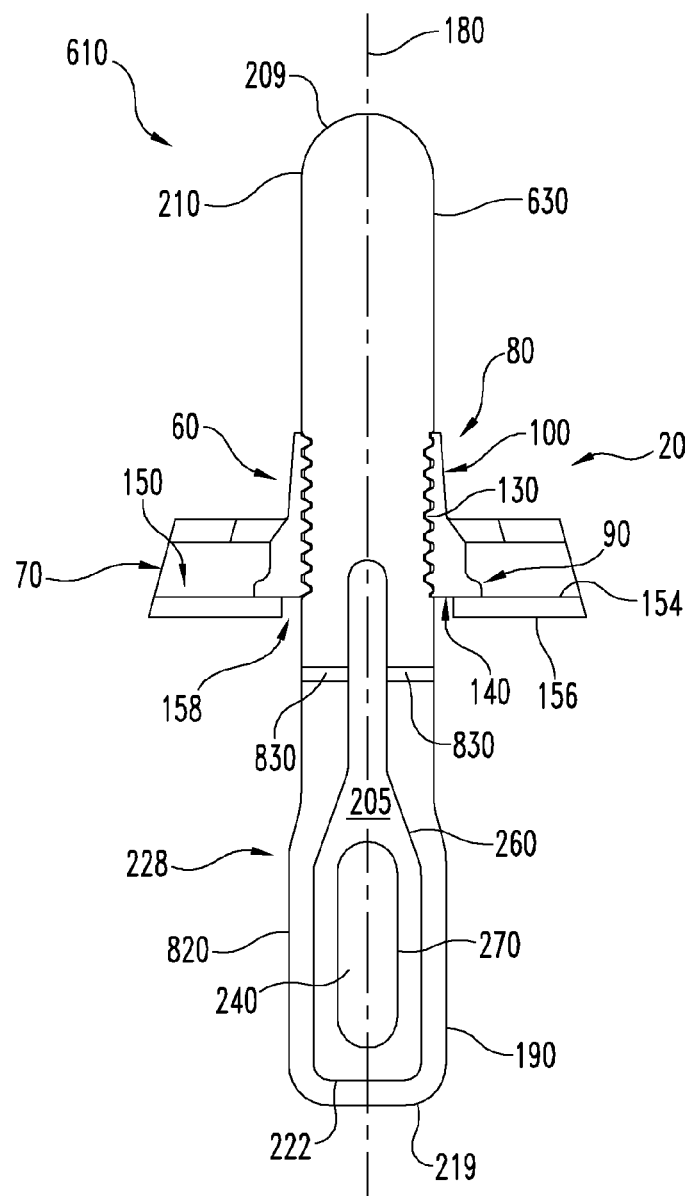
FIG. 7 is an illustrative side view, similar to FIG. 2, showing another embodiment of the adhesive containing sleeve.

With reference to FIG. 7, there is illustrated a system according to another embodiment of the present application. Like features in the apparatus of FIG. 7 correspond to features in the apparatus of FIGS. 1-6 and are identified with like reference numbers. An adhesive containing sleeve 630 passes through the nut plate assembly 20. The sleeve 630 includes an upper portion 210 and a lower portion 820. As described above, preparation of the adhesive requires squeezing and/or kneading of the sleeve 630 to break or puncture at least a portion of the inner thin wall 270 allowing the epoxy or hardener in the cavity 205 to mix with the other of the epoxy or hardener in the capsule 240. It is recognized that one skilled in the art would appreciate the various methods available for activating a multiple component adhesive in the sleeve in addition to squeezing and kneading or purely mechanical manipulation. The user continues to squeeze or knead the lower portion 820 to allow the adhesive to mix properly. After mixing the adhesive, a small notch or opening 830 is cut or punctured into the sleeve 630. To apply the adhesive, the user squeezes the lower portion 820 which forces the adhesive out of the notches 830 onto the substrate engaging surface 156. In one form, most, if not all, of the adhesive mixture 300 is applied to the substrate engaging surface 156. Other design constraints such as sleeve volume and mass sufficient for activating the adhesive may suggest having more adhesive mixture than necessary as would be appreciated by one skilled in the art. The adhesive mixture 300 is preferably pre-measured to ensure proper attachment of the substrate engaging surface 156 of the attachment base or basket 70 to the substrate 40. The nut plate assembly 20 is then pressed onto the substrate 40.

Figure 8:
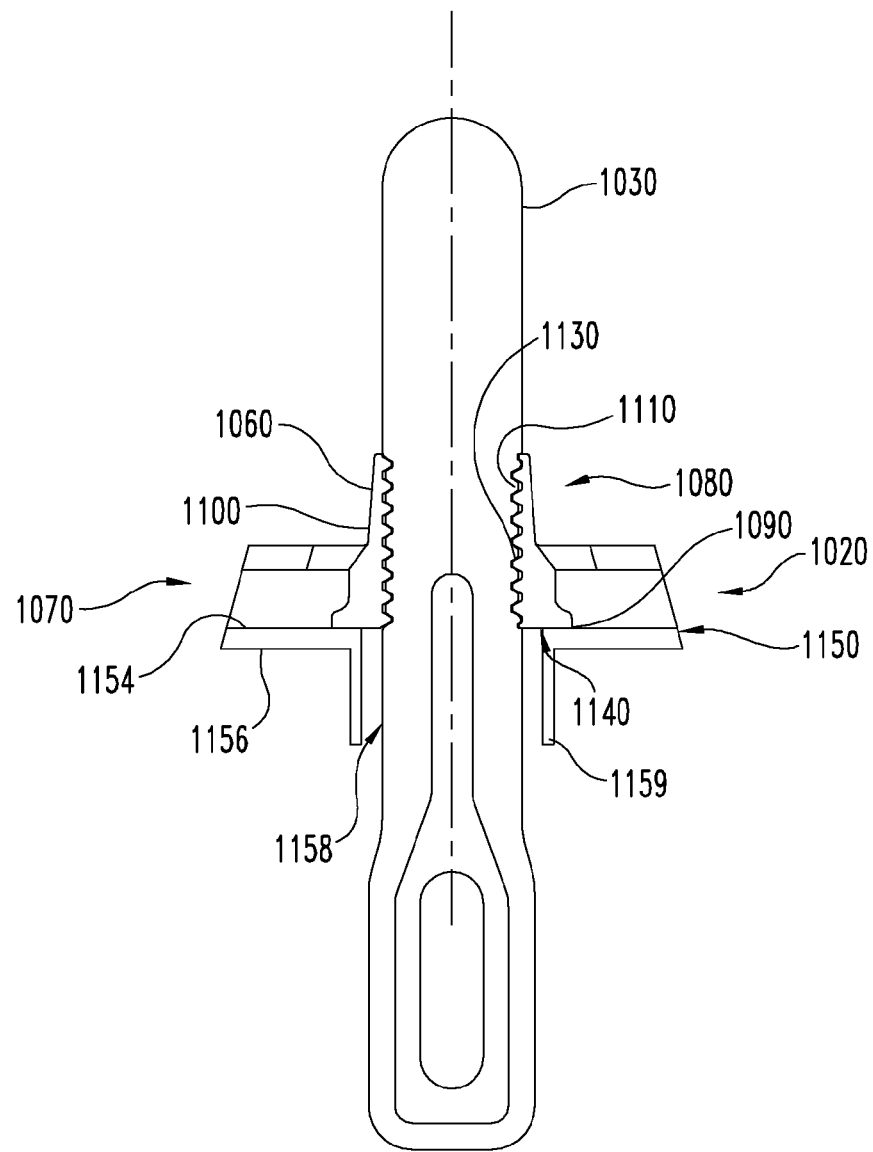
FIG. 8 is an illustrative side view cut-away of another embodiment of a nut plate assembly and an adhesive containing sleeve.

With reference to FIG. 8, there is illustrated an apparatus according to another embodiment of the present application comprising an adhesive containing sleeve 1030 passing through a nut plate assembly 1020. The nut plate assembly 1020 is adapted for mounting to a substrate (not shown) which may include at least one opening. As shown in FIG. 8, the nut plate assembly 1020 includes a nut 1060 and an attached bracket or basket 1070. The preferably substantially annular nut 1060 includes an upper end 1080 and a lower end 1090. Other nut designs may be accommodated by a sleeve as would be appreciated by one skilled in the art. The upper portion of nut 1060 includes an outer surface 1100 and an inner surface 1110. The inner surface 1110 has a plurality of threads 1130 operable to receive a fastener (not shown). The lower end 1090 is attached to the plate portion 1150 of the basket 1070. The plate portion 1150 includes a top surface 1154 at least a portion of which is attached to the lower end 1090 of the nut 1060. The plate portion 1150 also includes a bottom or substrate engaging surface 1156 operable for contact with the substrate.

The plate portion 1150 defines an opening 1158 aligned with the opening defined by the inner surface 1110 of the nut 1060 and a swage portion 1159. The swage portion 1159 provides additional anchoring ability to the adhesive when used to attach the nut plate assembly 1020 to the substrate. In one form, the swage feature 1159 is sized for a press fit into the opening in the substrate. The attachment of the nut plate assembly 1020 is similar to the attachment of the nut plate assembly 20, as described above, with the exception of press fitting the swage portion 1159 into the opening of the substrate. Swage portion 1159 engaging the opening adds additional anti-torque resistance to the nut plate assembly 1020 such that the nut plate will not break loose upon installation of a threaded fastener.

Figure 9:
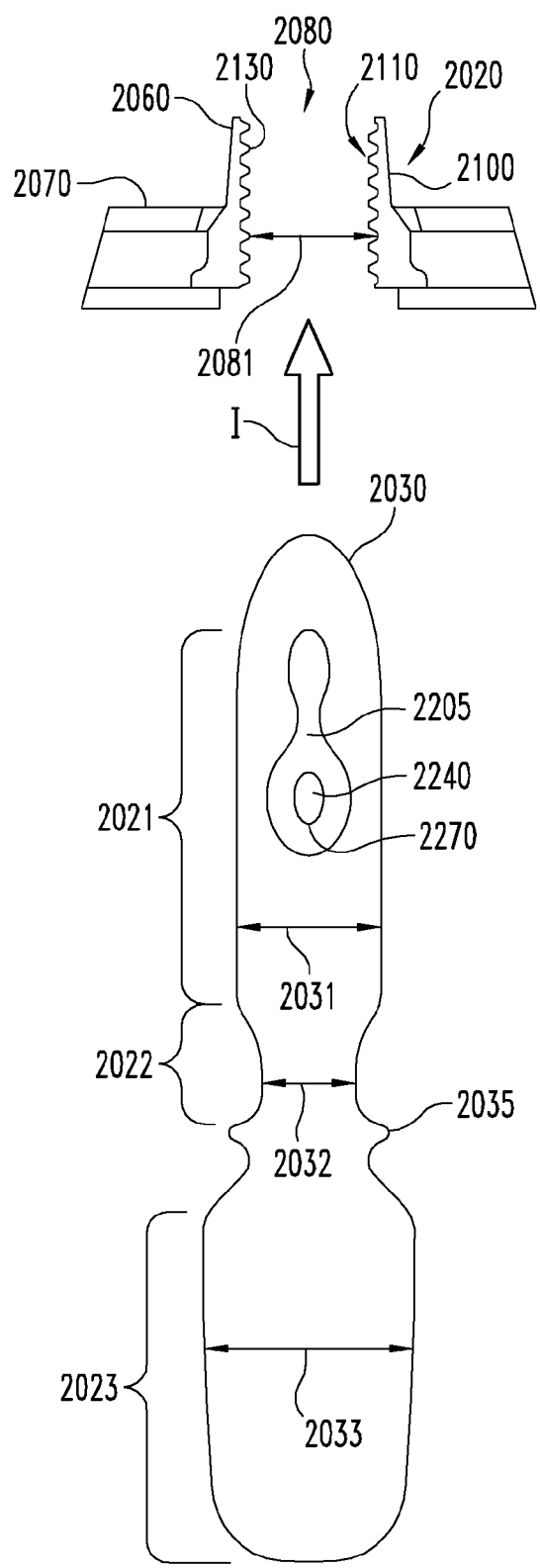
FIG. 9 is an illustrative side sectional view of another embodiment of a nut plate assembly and an adhesive containing sleeve.
Figure 10:
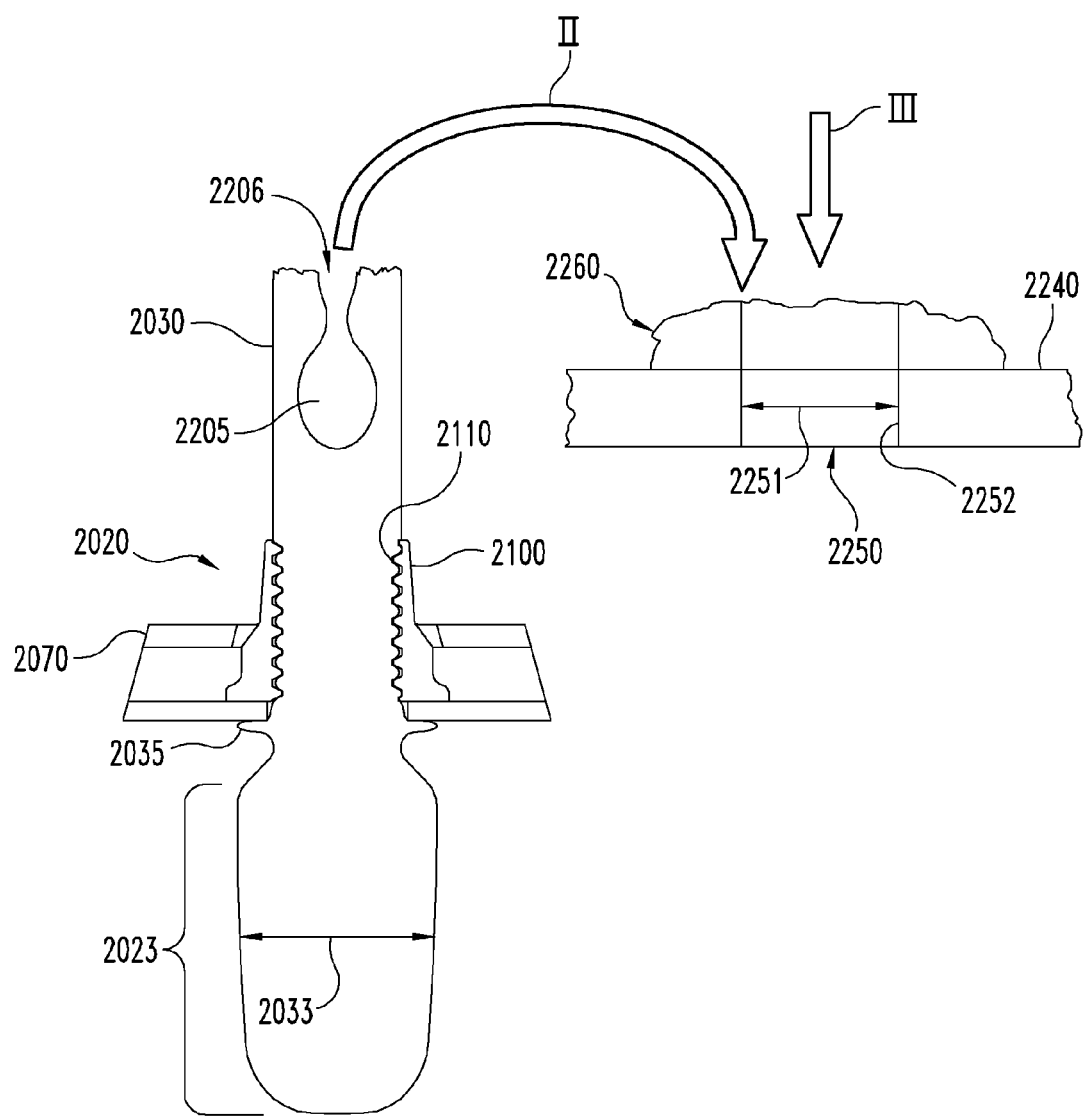
FIG. 10 is an illustrative side sectional view of the nut plate assembly coupled with the adhesive containing sleeve of FIG. 9, and a substrate.
Figure 11:
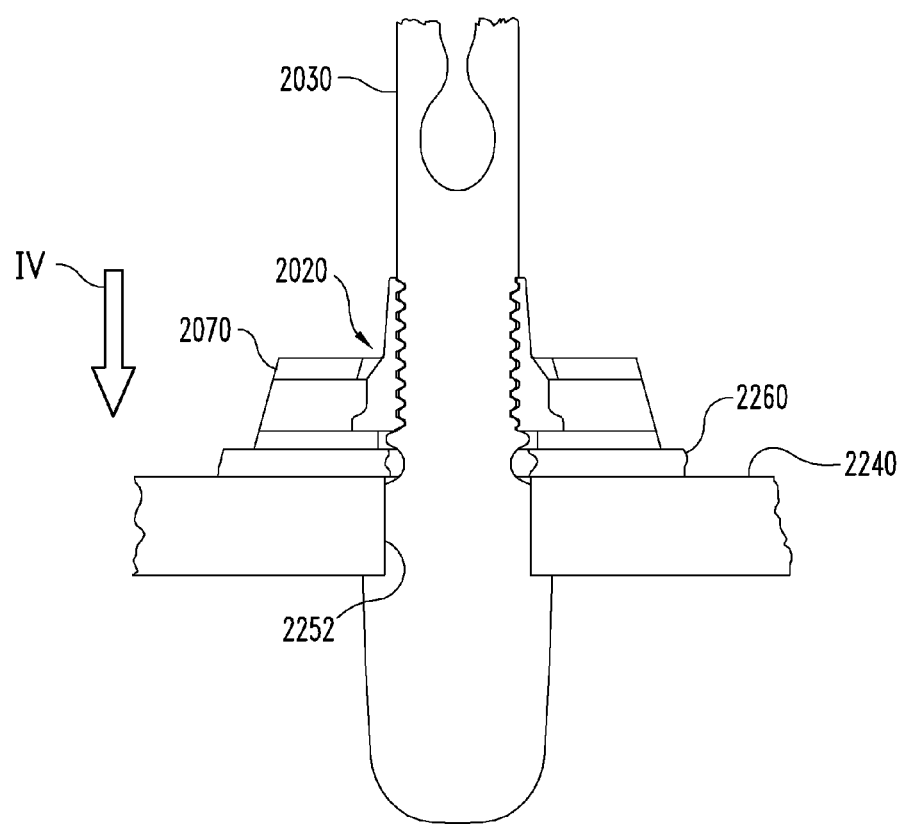
FIG. 11 is an illustrative side sectional view the nut plate assembly and the adhesive containing sleeve coupled with the substrate of FIG. 10.

With reference to FIGS. 9-11 there is illustrated a nut plate assembly 2020, a sleeve 2030, and a substrate 2040. The nut plate assembly 2020 and the substrate 2040 may be formed of a number of materials, for example, those described in connection with the additional embodiments disclosed herein. It shall be appreciated that the embodiment illustrated in FIGS. 9-11 may include further features, characteristics, and variations described in connection with the additional embodiments disclosed herein which have not been repeated in order to provide a concise disclosure. The nut plate assembly 2020 includes an internally threaded nut 2060 and a 2070 which may be coupled in a number of manners. The nut 2060 includes an outer surface 2100 and an inner surface 2110. The inner surface 2110 defines threads 2130 operable to receive a fastener (not shown). The inner surface 2110 also defines a hollow passageway 2080 extending through the nut 2060 and having a diameter 2081

The sleeve 2030 preferably comprises an elastomeric material such as a polymer or polymer based material. The sleeve 2030 includes an internal cavity 2205 which contains an adhesive. In the embodiment illustrated in FIGS. 9-11 the cavity 2205 is located toward a first end of the sleeve 2030. In other embodiments the cavity 2205 can be located in other regions within sleeve 2030. The cavity 2205 of sleeve 2030 contains epoxy resin and a frangible capsule 2240 positioned within the cavity 2205 contains hardener. The frangible capsule 2240 isolates the epoxy resin from the hardener. In other embodiments the cavity 2205 of sleeve 2030 contains hardener and a frangible capsule 2240 positioned within the cavity 2205 contains epoxy resin which it isolates from the hardener. In further embodiments the cavity 2205 is divided into two parts separated by a frangible divider and the two separate parts contain epoxy resin and hardener, respectively. The sleeve 2030 can be manipulated to rupture the frangible capsule 2240 and mix the epoxy resin and the hardener within the cavity 2205, for example, by squeezing or kneading the portions of sleeve 2030 containing the cavity 2205.

The sleeve 2030 includes a first region 2021 having a first diameter 2031, a second region 2022 having a second diameter 2032, and a third region 2023 having a third diameter 2033. The sleeve 2030 further includes a flange 2035 positioned intermediate the second region 2022 and the third region 2023. As illustrated in FIG. 9 the sleeve 2030 can be introduced into the hollow interior 2080 of the nut 2060 in the direction indicated by arrow I. The first diameter 2031 of the first region 2021 is sized to be greater than the diameter 2081 of the hollow passageway 2080 of the nut 2060, but to allow the first region 2021 to be introduced into and passed through the hollow interior 2080 through deformation of the elastomeric material of the first region 2021. The second diameter 2032 of the second region 2022 is sized to be greater than the diameter 2081 of the hollow passageway 2080 of the nut 2060, and to be less than first diameter 2031 of the first region 2021.

As illustrated in FIG. 10 the sleeve 2030 can be advanced into the hollow interior 2080 of the nut 2060 to the point where the second region 2022 substantially occupies the hollow interior 2080 of the nut 2060. The location of the flange 2035 relative to the bracket 2070 provides an indication of when the desired positioning of the sleeve 2030 relative to the nut assembly 2020 has been achieved. The size difference between the second diameter 2032 and the first diameter 2031 facilitates seating of the nut 2060 over the second region 2022 by decreasing the resistance to movement of the sleeve 2030 as the second region 2032 passes into the hollow interior 2080 of the nut 2060. Because the diameter 2032 of the second region 2022 is smaller than the diameter 2031 of the first region 2021 it experiences less elastomeric deformation and applies less force against interior surface 2210 of the nut 2060 and consequently less resistance to movement in encountered as the second portion 2022 passes into the hollow interior 2080.

The second diameter 2032 of the second portion 2022 is greater than the diameter 2081 of the hollow interior 2080 and continues to apply force against interior surface 2210. This force contributes to maintaining the nut assembly 2022 in a fixed position relative to the sleeve 2030. The increased force that would be encountered upon the first potion 2021 reentering the hollow interior 2080 due to the greater size of diameter 2031 also contributes to maintaining the nut assembly 2022 in a fixed position relative to the sleeve 2030. Likewise, the increased force that would be encountered upon the third potion 2023 entering the hollow interior 2080 due to the greater size of diameter 2033 also contributes to maintaining the nut assembly 2022 in a fixed position relative to the sleeve 2030. The presence of the sleeve 2030 in the hollow interior 2080 provides protection for the threads 2130 from contaminants, for example, adhesive used during installation of the nut plate assembly 2020 onto the substrate 2040 as illustrated in FIG. 11 and described below in connection therewith. The positioning of flange 2035 adjacent to the bracket 2070 also provides protection from contaminants.

As illustrated in FIG. 10, after the epoxy resin and the hardener have been mixed within the cavity 2205, a portion of the sleeve 2030 can be removed or perforated. This allows the mixture of epoxy resin and hardener 2206 to exit the cavity 2205 through opening 2206. The sleeve 2030 can be used as an applicator to apply the mixture of epoxy resin and harder 2206 to a surface of the substrate 2240 as indicated by arrow II.

After application of the mixture of epoxy resin and harder 2206 to a surface of the substrate 2204, the third portion 2023 of sleeve 2030 can be inserted into the opening 2050 of the substrate 2040. The opening 2050 of the substrate 2040 has a diameter 2251 which is less than the diameter 2033 of the third potion 2023 of the sleeve 2030. Elastomeric deformation of the sleeve 2030 allows the third potion 2023 of the sleeve 2030 to be advanced through the opening 2250 in the direction indicated by arrow III.

As illustrated in FIG. 11, the sleeve 2030 is advanced through the opening 2250 to bring the bracket 2070 of the nut plate assembly 2020 into contact with the mixture of epoxy resin 2260 applied to the substrate 2240. From this position force can be applied to the sleeve 2030 in the direction indicated by arrow IV to apply a clamping force to the nut plate assembly 2020 also in the direction indicated by arrow IV. The sleeve 2030 also exerts a force against the surface 2252 of the opening 2250 which provides resistance to movement of the sleeve 2030 and maintains the clamping force. The clamping force can be maintained until the mixture of epoxy resin 2260 is sufficiently hardened or cured. At this point the sleeve 2030 can be advanced out of the opening 2250 either in the direction indicated by arrow IV or in the opposite direction. The nut plate assembly 2020 remains attached to the substrate 2050 and a fastener (not shown) such as a bolt can be coupled with the nut 2060.

Nut plates exist that are bonded in place. However the epoxy is mixed separately and applied by hand to the bottom surface of the nut plate basket. This process can be messy and is imprecise, eventually leading to the potential of introducing foreign object damage (FOD) into, for example, an aircraft system. Various embodiments of the present invention minimize or eliminate the need for pre-mixing. Additionally, various embodiments of the present invention permit the deposit of the appropriate amount of epoxy, with minimal to no waste, required to attach the nut plate to the mating surface. Furthermore, no special tools are required to bond the nut plate to the substrate.

The embodiments of the invention illustrated in the Figures described above comprise a nut plate arrangement containing a threaded nut, a basket to hold the nut, and a sleeve containing an adhesive mixture. It should be understood that while the sleeve is described as preferably a polymer, other flexible or squeezable sleeves are contemplated as within the scope of the invention. Similarly, while the sleeve is described as including an epoxy and a hardener, other adhesives known to those of ordinary skill in the art are contemplated as within the scope of the invention.

Furthermore, various embodiments illustrate cross-sectional views of the configuration comprising a frangible capsule containing either the epoxy or hardener with the cavity filled with the other of the epoxy or hardener. However, other embodiments are contemplated as within the scope of the invention. For example, the polymer sleeve essentially has two chambers, one to hold the epoxy and the other to hold the hardener. Instead of a capsule, the at least partially hollow interior of the polymer sleeve may define two chambers that remain separate until the time installation of the nut plate is required. The two chambers may be positioned separately at either end of the polymer sleeve, or together at either end of the polymer sleeve. A thin or otherwise breakable section within the polymer sleeve preferably separates the two chambers.

The embodiments of the present invention may be used any where a nut plate is used including, but not limited to, aircraft airframes.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus, comprising:
    a nut having an internally threaded opening;
    a basket attached to the nut, the basket having an access opening that at least partially overlaps the threaded opening of the nut; and
    a sleeve extending through the opening of the nut and the access opening of the basket, the sleeve having an at least partially hollow interior including an adhesive.

2. The apparatus of claim 1, wherein the basket is attached to a lower end of the nut; and wherein the opening in the nut is a central opening.

3. The apparatus of claim 1, wherein the adhesive includes an epoxy, and wherein the interior of the sleeve further includes a hardener separated from the epoxy.

4. The apparatus of claim 3, wherein the interior of the sleeve defines a first chamber containing the epoxy and a second chamber containing the hardener.

5. The apparatus of claim 4, wherein at least a portion of an intervening wall between the first chamber and the second chamber is frangible.

6. The apparatus of claim 1, wherein the sleeve includes a neckdown area at a portion spaced apart from a bottom surface of the basket.

7. The apparatus of claim 1, wherein a portion of the interior of the sleeve includes a mixing chamber, and wherein the sleeve is flexible around the portion of the interior.

8. The apparatus of claim 7, wherein the mixing chamber contains a frangible capsule, and wherein at least one of the epoxy and the hardener are within the capsule and the other of the epoxy and the hardener are external to the capsule.

9. The apparatus of claim 1, wherein a bottom surface of the basket adjacent to the access opening includes a swage.

10. An apparatus, comprising: a nut, a plate attached to the nut, and a sleeve passing through an aligned pair of openings in the nut and the plate, the sleeve having an at least partially hollow interior that contains an adhesive.

11. The apparatus of claim 10, wherein the adhesive includes an epoxy, and wherein the interior further includes a catalyzing agent separated from the epoxy.

12. The apparatus of claim 11, wherein the interior of the sleeve defines a first chamber containing the epoxy and a second chamber containing the catalyzing agent.

13. The apparatus of claim 11, wherein the sleeve comprises a polymer.

14. The apparatus of claim 10, wherein a portion of the interior of the sleeve includes a mixing chamber and the sleeve is flexible around the portion of the interior.

15. The apparatus of claim 10, wherein the adhesive is a two part adhesive, and the hollow interior contains a frangible capsule, and wherein at least one part of the two part adhesive is within the capsule and another part of the two-part adhesive is within the hollow interior and external to the capsule.

16. The apparatus of claim 1, wherein a bottom surface of the basket adjacent to the access opening includes a swage.

* * * * *